Nov. 5, 1968  G. I. LE MASTER ET AL  3,409,510
PROCESS FOR DISTILLING ETHYL ALCOHOL BY THE
ADDITION OF A BLEND OF SILOXANES
Filed Oct. 19, 1966
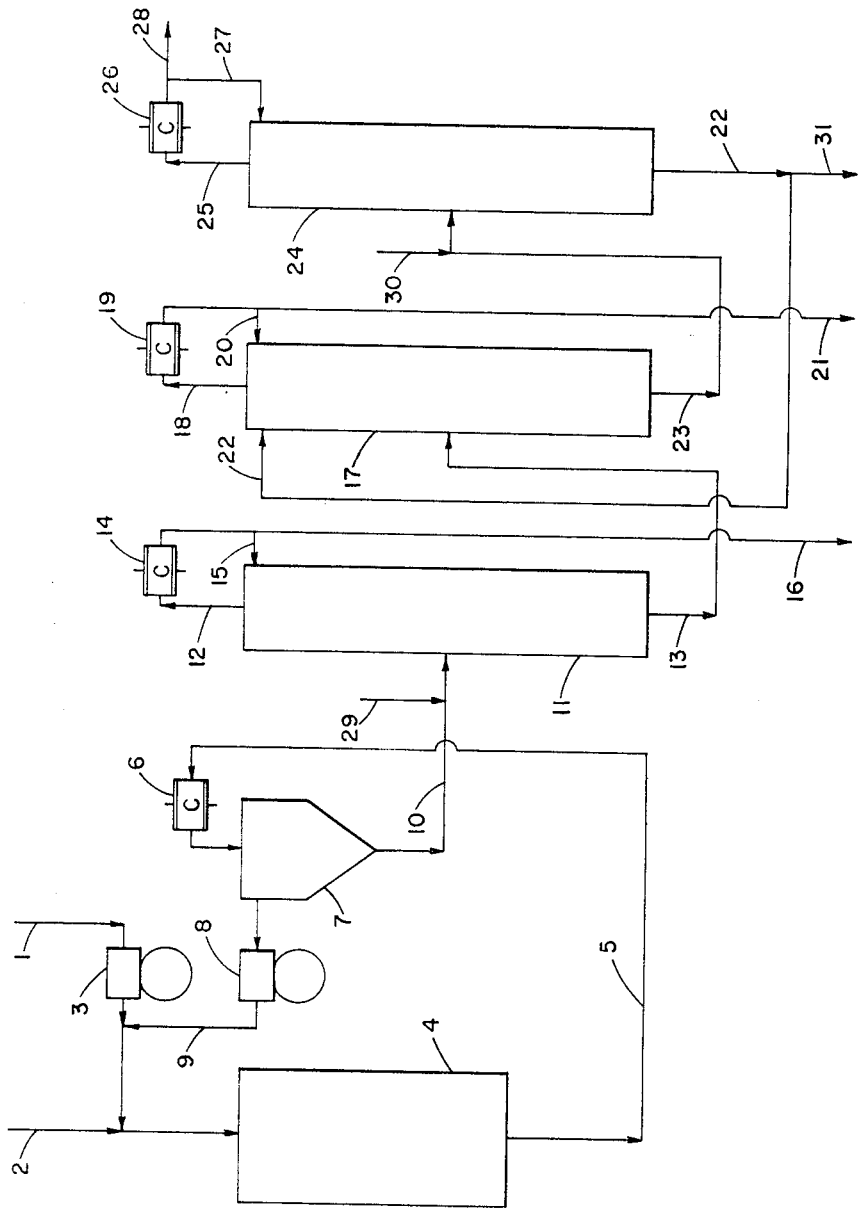
GREGG I. LEMASTER
DON S. MARTIN
INVENTORS
BY William T. French
Cecil D. Guillen Jr.
ATTORNEYS

United States Patent Office 3,409,510
Patented Nov. 5, 1968

3,409,510
PROCESS FOR DISTILLING ETHYL ALCOHOL BY THE ADDITION OF A BLEND OF SILOXANES
Gregg I. Le Master and Don S. Martin, Longview, Tex., assignors to Eastman Kodak Company, Rochester, N.Y., a corporation of New Jersey
Filed Oct. 19, 1966, Ser. No. 587,705
8 Claims. (Cl. 203—20)

ABSTRACT OF THE DISCLOSURE

Pressure buildup in ethanol refining columns is materially inhibited by the use of certain water-dispersible polymers of dialkyl siloxanes.

---

This invention relates to a process for distilling ethyl alcohol; and, more particularly, it relates to an improved process for distilling aqueous ethyl alcohol mixtures.

In the distillation of aqueous ethyl alcohol mixtures to make highly refined alcohol, processing difficulties are frequently encountered which either entirely prevent the production and recovery of the highly refined product or necessitate the use of further processing steps at an additional expense in order to produce the refined product. One processing difficulty which is frequently encountered is the build-up of pressure in the distillation column. Although the reason for the pressure increase is not known with certainty, it is thought to be caused by the presence of a stabilized dispersion of gas bubbles in the liquid. The result is that when a tray distillation column is used, the liquid on the tray accumulates to a greater depth than is desirable, resulting in entrainment of liquid with vapor and failure of downcomer seals causing the column to function improperly and resulting in an increased pressure drop. Unfortunately, as the pressure drop increases, the purity of the final product decreases. It has now been found that this increased pressure drop can be avoided by incorporating an additive into the distilling mixture.

It is an object of this invention to provide an improved process for distilling aqueous ethyl alcohol mixtures.

It is another object of this invention to provide a process for preventing a build-up of pressure in the distillation of aqueous ethyl alcohol mixtures.

It is still another object of this invention to provide an additive, which may be incorporated into aqueous ethyl alcohol mixtures to provide improved distillation properties.

It is still another object of this invention to provide an improved process for producing highly refined ethyl alcohol from a crude reaction product resulting from the hydration of ethylene.

Still other objects will appear from the more detailed description of this invention which follows.

The foregoing objects are accomplished in accordance with this invention by providing an improvement in a process for distilling an aqueous ethyl alcohol mixture to produce refined ethyl alcohol, the improvement comprising distilling the aqueous ethyl alcohol mixture containing as an additive 1–100 parts per million of a blend comprising (1) 20–60 percent by weight of a water-dispersible silicone having a viscosity of 20,000–80,000 centistokes and (2) 40–80 percent by weight of a water-dispersible silicone having a viscosity of 50–200 centistokes. In a preferred embodiment of this process, a reaction product resulting from the hydration of ethylene is subjected to a three-stage distillation process in the first stage of which low boilers are removed overhead and the bottoms product is fed into the second stage where an extractive distillation takes place on a mixture of the feed and additional water to produce a second bottoms product, which is fed into the third stage where a highly refined ethyl alcohol is produced as an overhead product; and a blend of water-dispersible silicones is incorporated into the feed to the first stage, or alternatively, the feed to the third stage.

The process of this invention may be understood more readily by reference to the attached drawing, which is a schematic flow sheet of the process as applied to the production of refined ethyl alcohol from a crude reaction product resulting from the hydration of ethylene. Ethylene gas at 1 is compressed in compressor 3 to a super-atmospheric pressure, and the pressurized gas is mixed with water 2 and fed into reactor 4 wherein the ethylene is hydrated to a crude aqueous ethyl alcohol mixture. Preferably, the hydration reaction is accomplished by passing the high pressure gaseous reactants through a bed of catalyst particles, which comprises supported phosphoric acid. The crude product may contain from about 75 to 85 percent by weight of water, 15 to about 25 percent of ethyl alcohol and minor amounts of other reaction products such as diethyl ether, acetaldehyde, hydrocarbons, and miscellaneous oxygenated products. Usually the total of such other reaction products amounts to less than 1 percent of the entire crude product. This crude product is fed through line 5 to condenser 6 and thence into vapor-liquid separator 7. The vapor product from separator 7 is pressurized in compressor 8 and returned through line 9 as a recycle to the feed stream entering reactor 4. The liquid product from separator 7 is introduced through feed line 10 into first distillation zone 11.

The distillation in zone 11 serves to remove low boiling products overhead without materially changing the proportions of water and ethyl alcohol. The distillate passes through line 12 into condenser 14 to produce a liquid reflux 15 which is returned to distillation zone 11 and a low boiler liquid product 16 which is discarded or subjected to other processing operations which are unrelated to this invention. The first bottoms product 13 from distillation zone 11 serves as the feed to second distillation zone 17.

Second distillation zone 17 performs an extractive distillation to separate additional impurities from the alcohol and water. Overhead distillate 18 passes through condenser 19 to produce a liquid reflux 20, a part of which is returned to distillation zone 17 and the remainder 21 is discarded or processed further in a manner unrelated to this invention. The separation agent, which is employed in the extractive distillation is water, which is introduced into the distillation zone 17 through line 22. A second bottoms product 23 is removed from distillation zone 17 and serves as a feed to third distillation zone 24.

Third distillation zone 24 performs the final refining step in the production of a highly refined ethyl alcohol. The overhead from distillation zone 24 is removed through line 25 and passed through condenser 26 to produce highly refined ethyl alcohol as a product 28, a portion of which is returned through line 27 as a reflux to distillation zone 24. The highly refined ethyl alcohol product 28 has a minimum purity of 190-proof, representing approximately a minimum of 95 percent of volume ethyl alcohol. Part of the bottoms product, which is substantially all water, is conducted via line 22 to distillation zone 17 to serve as the separation agent for the extractive distillation performed there. The remainder of the bottoms water is discarded via line 31.

In accordance with the improved process of this invention an additive is incorporated into the aqueous ethyl alcohol mixture through line 29 into the feed of first distillation zone 11, or, alternatively, through line 30 into the feed of third distillation zone 24. This additive is an aqueous dispersion of a blend of two types of silicones. The presence of the additive in the distilling mixture prevents pressure from building up in the distillation zones.

The additive which provides the improvement in this invention may consist of several ingredients although only two of them are of critical importance. The additive must contain two water dispersible silicones, one of high viscosity and the other of low viscosity, in order for the improvements of this invention to be evident. Any water-dispersible silicone of the proper viscosity is operable, whether it be organic or inorganic, although the preferred compositions are polymers of dialkylsiloxane, especially polymers of dimethylsiloxane. These silicones are available commercially under a variety of tradenames, made by a variety of manufacturers. In some instances, the silicones are marketed as anti-foam agents, but it must be understood that the anti-foaming property is not material to this invention since many other types of anti-foam agents have been found to be completely ineffective in preventing pressure build-up in a distillation process. It is necessary that the additive be a silicone in order to achieve the desired result.

The specific additive which provides the improvement of this invention is a mixture of (1) a water-dispersible silicone having a viscosity of 20,000 to 80,000 centistokes and (2) a silicone having a viscosity of 50–200 centistokes. The relative proportions of these two silicones may vary throughout a range in which about 20 to 60 percent by weight of both silicones is provided by the higher viscosity silicone while 40 to 80 percent by weight is provided by the lower viscosity silicone.

The blend of two silicones may comprise any convenient proportion of the entire additive although about 5 to 40 percent is a preferable range. The remaining 60 to 95 percent of the additive may include any of a variety of materials although the largest proportion is water. In certain embodiments of this invention, small amounts of emulsifying agents, gelling agents, wetting agents, pH control agents, and the like may be incorporated into the additive. Among the specific materials which are frequently included for such purposes are colloidal silica, fatty acid esters of sorbitan, oxyalkylated fatty acid esters, and hydroxybenzoates. In general, these modifiers will not amount to more than about 10 percent by weight of the total composition of the additive.

The amount of silicone-containing additive which is employed in the process of this invention may vary from about 1 to about 100 parts per million based on the total weight of the distilling aqueous alcohol mixture. The preferred amount is about 5 to about 20 parts per million, and this range represents the concentration which is normally employed in most embodiments of this invention.

The additive prevents a pressure build-up so long as the additive is present in the system, and as soon as the concentration of the additive approaches the lower end of the operable range the pressure begins to build-up to undesirable levels. Since the additive is water-dispersible, it is removed from each distillation zone in the streams which are water-rich. Thus, the additive in distillation zone 24 is removed almost completely in the bottoms product through line 22 and returned to distillation zone 17 to serve as the separation agent for the extractive distillation. Because some of the additive is lost through draw-off streams such as low boiler liquid product 16, condensate 21 and waste water 31 from column 24, make-up additive must be continually introduced into the distilling system at line 29 or line 30 in order to maintain the concentration at the desired level.

Certain embodiments of this invention are described in the following examples which are intended to illustrate specific features of the invention without restricting its broad scope. Parts and percentages are by weight and temperatures are in degrees centigrade unless otherwise specified.

EXAMPLE 1

A crude aqueous alcohol mixture was distilled in a column (functioning as distillation zone 24 of the drawing) 8 feet in diameter and containing 58 trays spaced 12 inches apart. The crude mixture employed as a feed to this column comprised 78–82 percent by weight water, 18–22 percent by weight ethyl alcohol, and trace amounts of diethyl ether, acetaldehyde, and hydrocarbons oils. The feed was introduced into the middle of the column at a rate of 330,000–360,000 gal./day. A silicone-containing additive was introduced into the feed at a rate of 5 to 20 parts per million based on total amount of aqueous alcohol feed. The additive had the following composition:

5% silicone having a viscosity of 50,000 centistokes
5% silicone having a viscosity of 100 centistokes
0.5% of colloidal silica
1.7% sorbitan monostearate
1.3% polyoxyethylene stearate
0.18% methyl p-hydroxybenzoate
0.02% propyl-p-hydroxybenzoate
4.0% gelling agent
2.0% of a 10% solution of caustic soda Under these conditions, the distillation column operated efficiently to produce 65,000–72,000 gal./day of 192-proof ethyl alcohol.

When the foregoing conditions were modified by stopping the addition of the silicone-containing additive, the column pressure rose within 30 minutes of the cessation of additive introduction. The proof of the ethyl alcohol product dropped rapidly and continued to drop even further as operations continued under these conditions.

EXAMPLE 2

The distillation process described in Example 1 was repeated except that the silicone-containing additive had the following composition:

30% dimethyl polysiloxane emulsified in water
1.5% polyoxyethylene stearate
3.0% alkylphenol-ethylene oxide condensation product The highly refined ethyl alcohol product was produced at substantially the same rate and the same high proof as described in Example 1.

EXAMPLE 3

A crude aqueous alcohol mixture was distilled in a column (functioning as distillation zone 11 of the drawing) having a top section 72 inches in diameter and containing 26 trays spaced 12 inches apart and a bottom section 54 inches in diameter and containing 36 trays spaced 12 inches apart. The crude aqueous alcohol mixture fed into the middle of this distillation column at a rate of 335,000–365,000 gal./day had a composition of 75–90 percent water, 10–25 percent ethyl alcohol, 0.1–0.4 percent diethyl ether, 0.04–0.2 percent acetaldehyde, and 0.1–0.3 percent hydrocarbon oils. Along with the feed stream, there was introduced 5–20 parts per million of a water dispersed silicone-containing additive having substantially the same composition as that described in Example 1. The column operated without a pressure build-up to produce 330,000–360,000 gal./day of a product having the following composition:

| | | |
|---|---|---|
| Water | vol. percent | 75–90 |
| Ethyl alcohol | do | 10–25 |
| Diethyl ether | | Trace amounts. |
| Acetaldehyde | | Do. |
| Hydrocarbon oils | | Do. |

The overhead take-off had the following composition:

| | Vol. percent |
|---|---|
| Water | 5–7 |
| Ethyl alcohol | 45–50 |
| Diethyl ether | 35–40 |

| | Vol. percent |
|---|---|
| Acetaldehyde | 5–10 |
| Hydrocarbon oils | 1–5 |

When the addition of the silicone-containing additive was stopped, the pressure in the column rose within 30 minutes and resulted in a poor separation of alcohol from the ether, acetaldehyde.

EXAMPLE 4

The distillation process described in Example 3 was repeated with the exception that the silicone-containing additive was changed to that described in Example 2. The resulting separation was substantially the same as that described above in Example 3.

Although the invention has been described in considerable detail with reference to certain preferred embodiments thereof, it will be understood that variations and modifications can be affected within the spirit and scope of the invention as described hereinabove and as defined in the appended claims.

We claim:

1. In a process for distilling an aqueous ethyl alcohol mixture to produce refined ethyl alcohol, the improvement which comprises distilling said aqueous ethyl alcohol mixture containing as an additive 1–100 parts per million of a blend comprising (1) 20–60 percent by weight of a water-dispersible polymer of dialkylsiloxane having a viscosity of 20,000–80,000 centistokes and (2) 40–80 percent by weight of a water-dispersible polymer of dialkylsiloxane having a viscosity of 50–200 centistokes.

2. In a process for distilling an aqueous ethyl alcohol mixture to produce refined ethyl alcohol, wherein the aqueous ethyl alcohol mixture is distilled in a series of three distillation zones, the first of which removes low boilers overhead and produces a first bottoms product which serves as the feed to the second zone wherein an extractive distillation takes place with added water as the separating agent to produce a second bottoms product which serves as the feed to the third zone producing refined ethyl alcohol as an overhead product, the improvement which comprises distilling said aqueous ethyl alcohol mixture in the presence of 1–100 parts per million of an additive comprising a blend of (1) 20–60 percent by weight of a water-dispersible polymer of dialkylsiloxane having a viscosity of 20,000–80,000 centistokes and (2) 80–40 percent by weight of a water-dispersible polymer of dialkylsiloxane having a viscosity of 50–200 centistokes.

3. The process of claim 2, wherein said additive is introduced into said aqueous ethyl alcohol mixture along with the feed to said first zone.

4. The process of claim 2, wherein said additive is introduced into said aqueous ethyl alcohol mixture along with the feed to said third zone.

5. The process of claim 2, wherein the feed to said first zone is the product of a reaction wherein ethylene gas under superatmospheric pressure is hydrated with water in a vapor phase reaction in the presence of phosphoric acid as the catalyst.

6. The process of claim 2 in which said additive comprises 5–40 percent by weight of said blend of water-dispersible polymers of dialkyl siloxane; not more than 10 percent by weight of a mixture of substances selected from the group consisting of an emulsifying agent, a wetting agent, a gelling agent, and an alkaline material suitable for pH control; and the remainder water.

7. The process of claim 1, wherein said refined ethyl alcohol is at least as pure as 190-proof.

8. The process of claim 6, in which said polymers of dialkyl siloxane comprise dimethyl polysiloxane.

References Cited
UNITED STATES PATENTS

| | | | |
|---|---|---|---|
| 2,416,504 | 2/1947 | Trautman et al. | 252—321 |
| 2,467,177 | 4/1949 | Zimmer | 252—321 |
| 2,461,371 | 2/1949 | Cole | 203—20 |
| 2,702,793 | 2/1955 | Smith | 252—321 |
| 2,801,211 | 7/1957 | Hulse et al. | 203—85 |
| 2,808,378 | 10/1957 | Baldwin et al. | 252—321 |
| 3,115,472 | 12/1963 | Currie et al. | 252—358 |
| 3,172,899 | 3/1965 | Bailey | 252—358 |
| 3,264,365 | 8/1966 | Luken | 203—20 |
| 3,267,042 | 8/1966 | Domba | 252—321 |

WILBUR L. BASCOMB, JR., *Primary Examiner.*